June 12, 1956  H. J. SCHOELLES  2,750,146
FLUID CONTROL VALVES FOR HEATERS AND OTHER DEVICES
Filed Nov. 22, 1950

Inventor
Harold J. Schoelles
By Willits, Helwig & Baillie
Attorneys

United States Patent Office 2,750,146
Patented June 12, 1956

2,750,146

FLUID CONTROL VALVES FOR HEATERS AND OTHER DEVICES

Harold J. Schoelles, Lockport, N. Y., assignor to General Motors Corporation, Detroit, Mich., a corporation of Delaware Application November 22, 1950, Serial No. 196,999

3 Claims. (Cl. 251—306)

This invention relates to a valve for controlling the flow of fluid from one compartment or passage to another, and has particular relation to a valve for controlling the flow of air in heating systems for automobiles.

An object of the invention is to provide an inexpensive valve for controlling the flow of fluid in automobile heaters and other apparatus or devices, to provide a valve which may be operated without objectionable noise, to provide a valve which may be manufactured with inexpensive tools and material, and to provide a valve which may be assembled in the apparatus or device with which it is employed with a minimum expenditure for labor and assembly equipment.

For a better understanding of the invention, reference may be had to the accompanying drawing forming a part of this specification, in which:

Figure 2 is taken in the plane of line 2—2 on Figure 1, looking in the direction of the arrows thereon, certain parts being broken away to more clearly show the structure of certain parts thereof.

Figure 1:
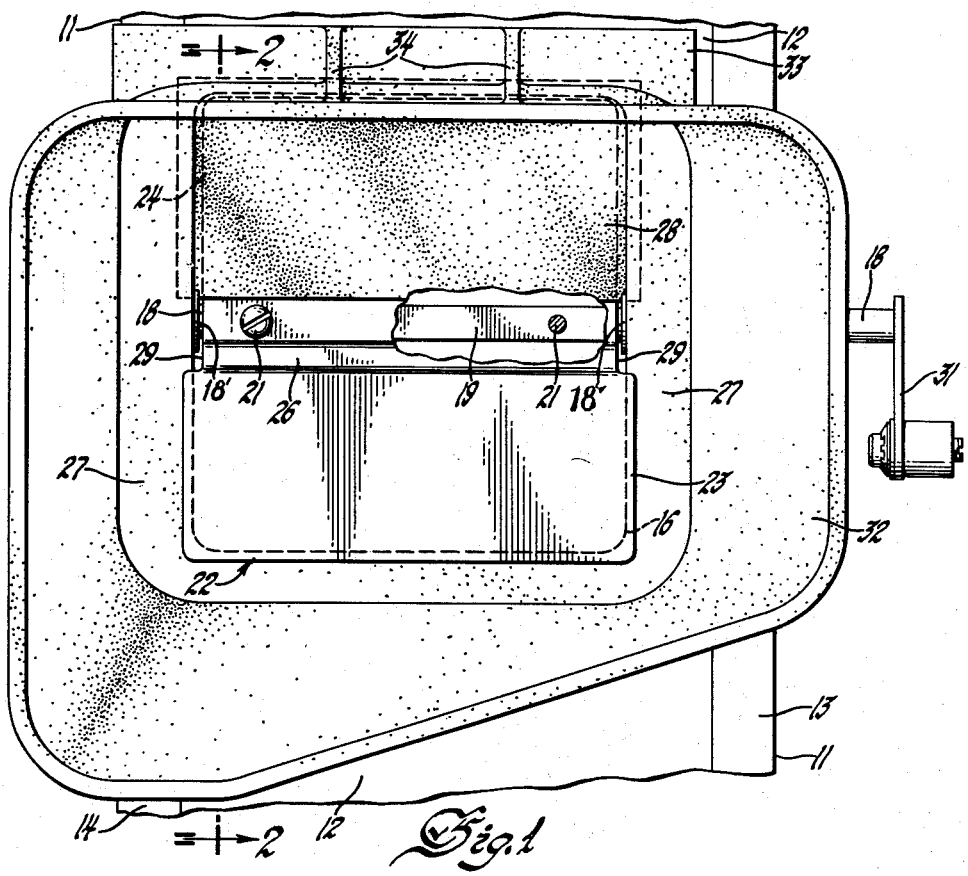
Figure 1 is a plan view of a part of an automobile heater including a valve structure embracing the principles of the invention.
Figure 2:
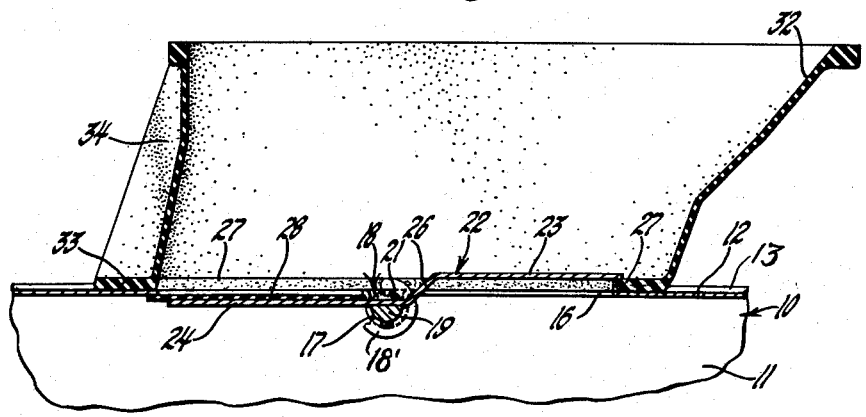
Figure 2 is a vertical sectional view of the structure shown by Figure 1.
Figure 3:
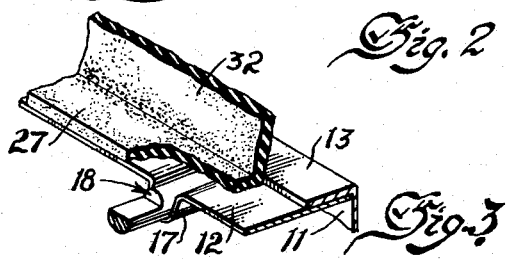
Figure 3 is a fragmentary perspective view, partly in section, of a portion of a heater casing showing the valve supporting shaft and one of the bearings therefor formed in said casing.

The structure illustrated by Figures 1 and 2 comprises a casing 10 having oppositely disposed side walls 11 and a top wall 12. The side walls 11 are flanged inwardly as is indicated at 13 and 14 for the purpose of providing means against which the opposite edges of the upper wall 12 may be secured. Before assembly of the casing 10, the top wall 12 is punched in such a way as to provide an outlet opening 16 and is crimped lengthwise of the opening 16 in such a way as to provide semicylindrical loops or bearings indicated at 17. The bearings 17 are adapted to receive and to support the oppositely disposed and cylindrical ends of a shaft indicated at 18. The shaft 18 between the bearings 17 is cut away along the axis thereof in such a way as to provide a semi-cylindrical shaft part indicated at 19. The shaft part 19 has secured thereto by means of screws indicated at 21 a metallic or other suitable plate or valve element indicated at 22. It will be apparent from Figure 2 of the drawing that the depth of the loops or bearings 17 is such that the cylindrical ends of the shaft 18 will be approximately tangent to a plane extending along the upper surface of the wall 12.

It will be apparent from Figure 1 that the opposite ends of the plate or valve element 22 are offset from one another in such a way as to provide offset parts indicated at 23 and 24 which extend along parallel planes above and below the surfaces of the wall 12. Also it will be noted from Figure 1 that the margin of the part 23 of the valve element 22 which extends above the wall 12 overlaps the wall 12 surrounding the corresponding part of the opening 16 whereas the remaining parts of the valve element 22 including the offset part 24 overlaps the wall 12 at the corresponding part of the opening 16. The part 23 of the valve element 22 terminates in an angularly disposed part indicated at 26 which is formed in the valve element 22 adjacent the part thereof secured to the semicylindrical shaft part 19.

Disposed on the exterior surface of the wall 12 and surrounding the opening 16 on one end and two sides thereof is a rubber or other resilient sealing flange 27 which may be secured to the surface of the wall 12 by staples or cement or other suitable means not shown. The thickness of the sealing flange 27 and the extent of the offset part 26 is such that the lower surface of the offset part 23 of the valve element 22 will engage and will form a relatively fluid tight fit with the upper surface of the sealing flange 27 when the valve element 22 is in closed position.

The offset part 24 of the valve element 22 is covered by a plate or a sheet of rubber or other suitable resilient material indicated at 28. The sheet 28 comprises a continuation of the offset part 24 of the valve element 22 and is of such extent with respect to the width and length of the opening 16 that the edges of the sheet or plate 28 will engage the lower surface of the wall 12 around the adjacent edges of the opening 16 when the valve element 22 is closed. It will be apparent from Figure 2 that the reduced portion of the valve element 22 which includes the angularly disposed part 26 and the part of the valve which is secured to the semicylindrical shaft part 19 in effect provides oppositely disposed notches 29 which extend between the laterally offset parts indicated by the numerals 24—28, and 23. The notches 29 provide clearance for the movement of valve 22 to opened and closed positions; by operation of the shaft 18 and a lever 31 by which the shaft 18 may be rotated. Washers 18' are mounted on shaft 18 and disposed between the ends of the reduced portion of valve 22 and the adjacent edges of opening 16. These washers prevent undue wear on sealing flange 27 during movement of valve 22 and assure smooth and quiet operation thereof.

The sealing flange 27 may also be employed for sealing an outlet conduit indicated at 32 which may, if desired, be formed of the same material as the sealing flange 27 and which may be formed integrally with the sealing flange 27 if such is desired. The end of the conduit 32 which is disposed oppositely relative to the offset valve part indicated at 23 may be sealed with respect to the outer surface of the wall 12 by an outwardly projecting sealing flange indicated at 33. This flange is reinforced externally of the conduit 32 and with respect to the end of the conduit 32 by ribs or webs indicated at 34. Insofar as the valve element 22 is concerned, the flanges 27 and 33 may be considered together as resilient sealing means forming a part of the wall 12 at the margin of the wall 12 adjacent the opening 16. This sealing means constitutes a seal between the conduit 32 and the casing 10.

It will be apparent that the valve element 22 may be quietly operated by movement of the shaft 18, by reason of the fact that the offset plate or valve element 22 and the wall 12 do not directly engage one another but are constructed in such a way as to close the opening 16 through contact between the oppositely disposed and offset ends of the valve which either engage or are constructed in such a way as to be formed of resilient material such as that indicated by the flange 27 and the sheet or plate 28. It will also be apparent that the valve structure 22 is quite simple, that it may be easily assembled, and that it may be operated by the shaft 21 within the limits provided by the notches 29.

I claim:

1. An air valve structure comprising a wall having an opening therein, with portions of said wall adjacent the edge of said opening being formed into aligned arcuate loops, a valve element for controlling said opening, said valve element being mounted on a shaft rotatably supported within said loops, resilient gasket means surrounding said opening and interposed between said valve element and said wall and located at the margin of said wall adjacent said opening, and said gasket means closing said loops to retain said shaft in position.

2. An air valve structure comprising a wall of thin material having an opening therein with portions of said wall at the margin thereof adjacent said opening being formed into arcuate loops aligned at one side of said wall, a valve element for controlling said opening mounted on a shaft rotatably supported in said loops, said valve element having offset portions at opposite sides of said shaft, and resilient gasket means interposed between said offset portions and said wall to perform a sealing function when said valve element is placed in its closed position, and gasket means being extended to close said loops and retain said shaft in supported position.

3. A valve structure suitable for controlling air flow into an automobile comprising a flat and thin wall having an opening therein through which fluid may flow, valve engaging surfaces disposed adjacent said opening at opposite sides of said wall, a rockable valve element for engaging said surfaces to close said opening, said valve element comprising a pair of offset portions, a first sealing member provided on one of said valve engaging surfaces and adapted for engagement by one of said offset portions when said valve element is in closed position, a second sealing member secured to the other of said offset portions and adapted to overlap and engage the other of said valve engaging surfaces when said valve is in closed position, a shaft secured to said valve element between the ends of the latter, loops formed in said wall for the ends of said shaft, and said first sealing member being extended to retain said ends within said loops.

References Cited in the file of this patent

UNITED STATES PATENTS

| | | |
|---|---|---|
| 461,206 | Goll | Oct. 13, 1891 |
| 808,397 | Meakin | Dec. 26, 1905 |
| 1,556,332 | Gorman | Oct. 6, 1925 |
| 2,108,183 | Sjoberg | Feb. 15, 1938 |
| 2,402,208 | Read | June 18, 1946 |
| 2,493,736 | Brown | Jan. 10, 1950 |

FOREIGN PATENTS

| | | |
|---|---|---|
| 23,295 | France | of 1859 |
| 559 | Great Britain | of 1862 |
| 66,582 | Sweden | of 1926 |